US 12,459,715 B2

(12) United States Patent
Vishtal et al.

(10) Patent No.: US 12,459,715 B2
(45) Date of Patent: Nov. 4, 2025

(54) MULTI-LAYER FLEXIBLE PACKAGING MATERIAL

(71) Applicant: SOCIETE DES PRODUITS NESTLE S.A., Vevey (CH)

(72) Inventors: Alexey Vishtal, Lausanne (CH); Hock Seng Gordon Soh, Punggol Drive (SG)

(73) Assignee: Societe des Produits Nestle S.A., Vevey (CH)

( * ) Notice: Subject to any disclaimer, the term of this patent is extended or adjusted under 35 U.S.C. 154(b) by 455 days.

(21) Appl. No.: 17/904,234

(22) PCT Filed: Feb. 17, 2021

(86) PCT No.: PCT/EP2021/053833
§ 371 (c)(1),
(2) Date: Aug. 15, 2022

(87) PCT Pub. No.: WO2021/165290
PCT Pub. Date: Aug. 26, 2021

(65) Prior Publication Data
US 2023/0087382 A1 Mar. 23, 2023

(30) Foreign Application Priority Data
Feb. 17, 2020 (EP) ...................................... 20157788

(51) Int. Cl.
*B65D 65/42* (2006.01)
*D21H 11/14* (2006.01)
(Continued)

(52) U.S. Cl.
CPC ............. *B65D 65/42* (2013.01); *D21H 11/14* (2013.01); *D21H 19/08* (2013.01); *D21H 19/22* (2013.01);
(Continued)

(58) Field of Classification Search
CPC ........ B65D 65/42; D21H 11/14; D21H 19/08; D21H 19/22; D21H 19/40; D21H 19/60;
(Continued)

(56) References Cited

U.S. PATENT DOCUMENTS

| | | | |
|---|---|---|---|
| 2011/0132975 A1* | 6/2011 | Toft | ........................ B32B 27/18 428/323 |
| 2011/0143070 A1* | 6/2011 | Toft | .................... C23C 14/5886 427/248.1 |

(Continued)

FOREIGN PATENT DOCUMENTS

| | | |
|---|---|---|
| WO | 2009112255 | 9/2009 |
| WO | 2011003564 | 1/2011 |

Primary Examiner — Nathan L Van Sell
(74) Attorney, Agent, or Firm — K&L Gates LLP

(57) ABSTRACT

The present invention relates generally to the field of multi-layer flexible packaging material. In particularly, the present invention relates to a multi-layer flexible packaging material comprising a paper layer, an aluminium layer, a nanoclay barrier coating layer, and a sealing layer applied to the surface of the nanoclay barrier coating layer representing the inner surface of the multi-layer flexible packaging material, said multilayer flexible barrier material being deprived of a polyolefin layer, such as a polyethylene (PE), polyethylene terepthalate (PET) or a polypropylene (PP) layer. The present invention further relates to the use of the multi-layer flexible packaging material in accordance with the present invention to package dry food.

12 Claims, 2 Drawing Sheets

Structure 1

Structure 2

(51) Int. Cl.
    *D21H 19/08*     (2006.01)
    *D21H 19/22*     (2006.01)
    *D21H 19/40*     (2006.01)
    *D21H 19/60*     (2006.01)
    *D21H 19/84*     (2006.01)
    *D21H 27/10*     (2006.01)

(52) U.S. Cl.
    CPC ............. *D21H 19/40* (2013.01); *D21H 19/60* (2013.01); *D21H 19/84* (2013.01); *D21H 27/10* (2013.01)

(58) Field of Classification Search
    CPC ........ D21H 19/84; D21H 27/10; D21H 19/02; D21H 19/82; D21H 21/52; B32B 2255/12; B32B 2255/205; B32B 2255/26; B32B 2255/28; B32B 2307/538; B32B 2307/7244; B32B 2307/7246; B32B 2307/7248; B32B 2307/7265; B32B 2307/75; B32B 2439/70; B32B 29/002
    See application file for complete search history.

(56) References Cited

U.S. PATENT DOCUMENTS

| | | | |
|---|---|---|---|
| 2012/0100320 A1* | 4/2012 | Toft | ................... B32B 27/32 |
| | | | 428/464 |
| 2018/0311940 A1* | 11/2018 | Toft | ................... B32B 5/20 |

* cited by examiner

Structure 1        Structure 2

MULTI-LAYER FLEXIBLE PACKAGING MATERIAL

CROSS REFERENCE TO RELATED APPLICATIONS

The present application is a National Stage of International Application No. PCT/EP2021/053833, filed on Feb. 17, 2021, which claims priority to European Patent Application No. 20157788.9, filed on Feb. 17, 2020, the entire contents of which are being incorporated herein by reference.

FIELD OF THE INVENTION

The present invention relates generally to the field of multi-layer flexible packaging material. In particularly, the present invention relates to a multi-layer flexible packaging material comprising a paper layer, an aluminium layer, a nanoclay barrier coating layer, and a sealing layer applied to the surface of the nanoclay barrier coating layer representing the inner surface of the multi-layer flexible packaging material. The present invention further relates to the use of the multi-layer flexible packaging material in accordance with the present invention to package dry food.

BACKGROUND OF THE INVENTION

Plastic packaging is used frequently in the economy and in people's daily lives. It has multiple advantages, such as its flexibility and its light weight. Such a weight reduction contributes to fuel saving and CO2 reduction during transport, for example. Its barrier properties help to reduce food waste due a positive effect on increasing shelf life. The barrier properties also help to secure food safety.

However, according to the European strategy for plastics in a circular economy, recently published by the European Commission, around 25.8 million tons of plastic waste are generated in Europe every year with less than 30% of such waste being collected for recycling and between 150 000 to 500 000 tons of plastic waste entering the oceans every year.

To ensure that plastic waste is reduced, significant efforts are made in the industry and in commerce. Several supermarkets replace plastic bags by paper based bags, for example. However, replacing plastics with paper in food packaging is not an easy task. A change in packaging material must not compromise consumer safety. The packaging must serve to protect the food, but must also be robust enough to be handled by machines during the production process, and must allow that the food product is presented effectively.

Hence, there is a need for paper based materials with improved barrier properties. There is—in particular—a need for paper based materials with improved barrier properties that do not include a plastic layer, to allow for easier sorting and separation of paper-based material during recycling.

WO 2000/076862 A9 describes in this respect a laminate structure for packaging applications comprising a paper substrate; and at least one polymer/nanoclay composite layer having clay particles with a thickness ranging from 0.7 to 9 nanometres applied to said paper substrate.

However, there is a need in the art to even further improve the barrier properties of a paper based packaging material.

In particular, for packaging intended for food products, good barrier properties are essential for maintaining the safety and quality of packaged foods. Typically, such barrier properties include gas permeability, for example O2, CO2, and N2; vapor permeability, for example water vapor; liquid permeability, for example water or oil; aroma permeability; and light permeability.

It would therefore be desirable to provide the art with a multi-layer flexible packaging material that exhibits improved barrier properties and is easier to recycle; and with a use of such a multi-layer flexible packaging material for packaging food products.

Any reference to prior art documents in this specification is not to be considered an admission that such prior art is widely known or forms part of the common general knowledge in the field.

SUMMARY OF THE INVENTION

The objective of the present invention was it to improve the state of the art and in particular to provide a multi-layer flexible packaging material that provides improved barrier properties and that is easier to recycle; and to provide the use of such a multi-layer flexible packaging material to package dry food products, or to at least to provide a useful alternative to packaging solutions existing in the art.

Metallized coatings are used in the art typically for visual appearance and are—hence—often found in luxury packaging, for example for alcoholic beverages or cosmetics.

Aluminium coatings are further used to coat plastic films, for example, to reduce oxygen and water vapour transmission.

However, to the inventor's best knowledge, it has not been taught or suggested in the art to laminate or extrude paper-based packaging materials that do not contain a polyolefin layer, such as a polyethylene (PE), polyethylene terepthalate (PET) or a polypropylene (PP) layer, with an aluminium coating.

The present inventors were surprised to see that by applying to a paper-based packaging material an aluminium layer, a nanoclay barrier coating layer, and a sealing layer applied to the surface of the nanoclay barrier coating layer representing the inner surface of the multi-layer flexible packaging material, water vapor transmission rate (WVTR) and oxygen transmission rate (OTR) test results could be achieved that satisfied the requirements for the packaging of dry food materials. Importantly, no polyethylene (PE) or a polypropylene (PP) layer was needed to achieve this objective.

Consequently, the objective of the present invention was achieved by the subject matter of the independent claims. The dependent claims further develop the concept of the present invention.

Accordingly, the present invention provides a multi-layer flexible packaging material comprising a paper layer, an aluminium layer, a nanoclay barrier coating layer, and a sealing layer applied to the surface of the nanoclay barrier coating layer representing the inner surface of the multi-layer flexible packaging material.

The present invention further provides a use of a multi-layer flexible packaging material in accordance with the present invention to package dry food.

As used in this specification, the words "comprises", "comprising", and similar words, are not to be interpreted in an exclusive or exhaustive sense. In other words, they are intended to mean "including, but not limited to".

The present inventors have shown that by using the multi-layer flexible packaging material in accordance with the present invention acceptable results in terms of WVTR and OTR could be achieved. The obtained results were better than a comparative experiment omitting the nanoclay barrier coating layer. Acceptable results were achieved when the nanoclay barrier coating layer was applied on top of the aluminium layer, when both, nanoclay barrier coating layer and aluminium layer were on the same side of the paper layer. Notably, acceptable results were also obtained when the nanoclay barrier coating layer and the aluminium layer were on opposite sides of the paper layer.

DETAILED DESCRIPTION OF THE INVENTION

Figure 1:
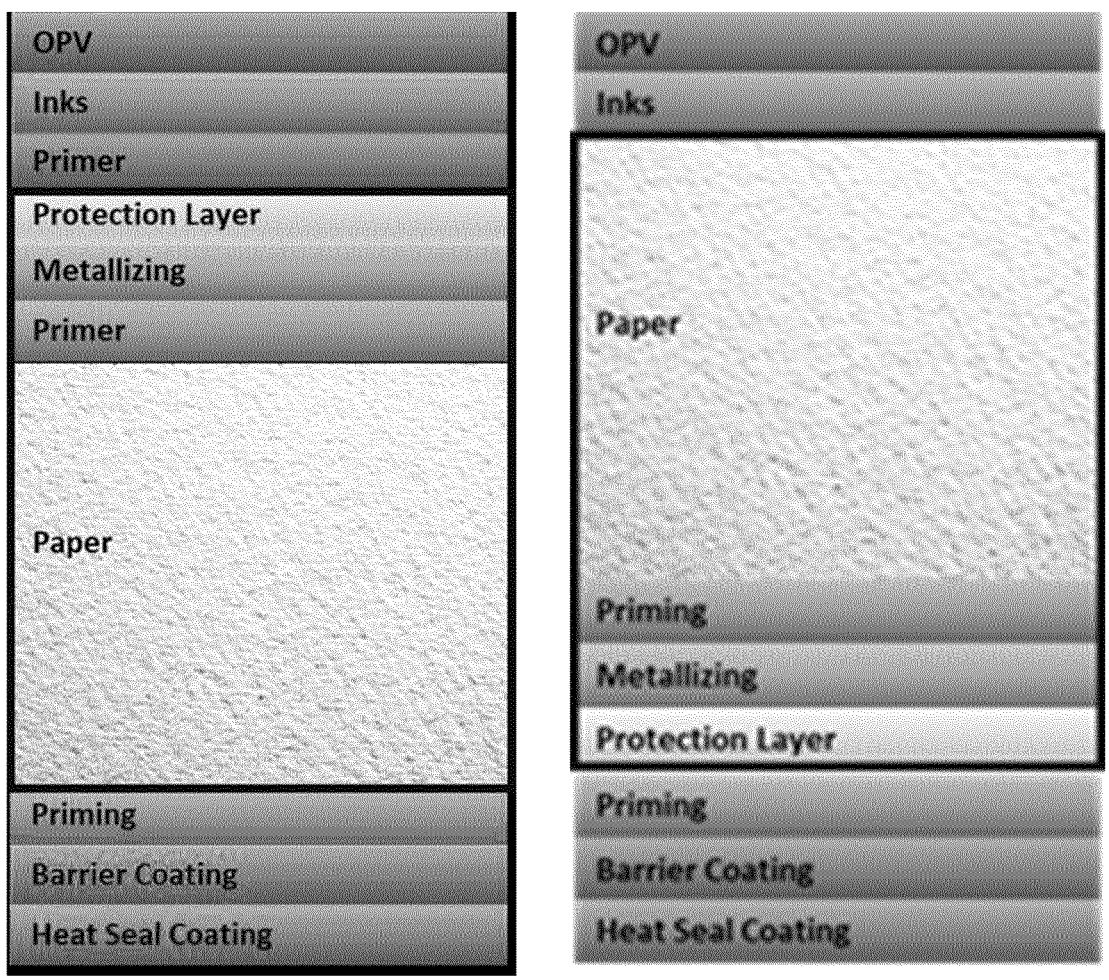
FIG. 1 shows schematically two different multi-layer flexible packaging materials in accordance with the present invention.

The present invention relates to a multi-layer flexible packaging material comprising the following layers from the outer surface to the inner surface:
  an aluminium layer having a thickness in the range of 20-500 nm,
  a paper layer having a grammage of 40 to 120 g/m2,
  a nanoclay barrier coating layer having a grammage in the range of 0.4-4 g/m2, and
  a sealing layer applied to the surface of the nanoclay barrier coating layer representing the inner surface of the multi-layer flexible packaging material, wherein said sealing layer is selected from the group consisting of acrylic acid copolymers, vinyl acetate, ethyl vinyl acetate, modified xylanes, chemically modified starch, or combinations thereof,
  said multilayer flexible barrier material being deprived of a polyolefin layer (such as polyethylene (PE), polyethylene terepthalate (PET) or a polypropylene (PP) layer).

A further embodiment of the present invention relates to a multi-layer flexible packaging material comprising
  a paper layer,
  an aluminium layer,
  a nanoclay barrier coating layer, and
  a sealing layer applied to the surface of the nanoclay barrier coating layer representing the inner surface of the multi-layer flexible packaging material,
  wherein the multi-layer flexible packaging material does not comprise a PE layer.

Another embodiment of the present invention relates to a multi-layer flexible packaging material comprising:
  a paper layer,
  an aluminium layer,
  a nanoclay barrier coating layer, and
  a sealing layer applied to the surface of the nanoclay barrier coating layer representing the inner surface of the multi-layer flexible packaging material,
  wherein the multi-layer flexible packaging material does not comprise a PP layer.

For the purposes of the present invention, a packaging material shall be considered flexible if it is a material capable of bending without breaking. Further, for example, such a flexible material may be a material that can be bent without breaking by hand. Typically, a multi-layer flexible packaging material in accordance with the present invention may have a basis weight of 140 g/m2 or less.

The aluminium layer may be an aluminium oxide layer.

People skilled in the art will be able to select an appropriate paper layer, for example, based on the product to be packaged, the intended shelf life and whether the paper material is to be used as primary, secondary or tertiary packaging. Typically, however, the paper layer may have a grammage in the range of 40-120 g/m2, 50-100 g/m2, or 60-85 g/m2.

The aluminium layer may be applied to the multi-layer flexible packaging material by physical vapor deposition For example, the aluminium layer may be applied by means of a vacuum deposition process. An example of a vacuum deposition process is described in Thin Solid Films, Volume 666, 30 Nov. 2018, Pages 6-14. Vacuum deposition is an evaporative process in which aluminium from a solid phase is transferred to the vapor phase and back to the solid phase, gradually building up film thickness. Coatings produced by vacuum deposition have the advantage of good abrasion resistance, impact and temperature strength, as well as the capability to be deposited on complex surfaces. The range of optical density for the aluminium layer may be in the range of 1.4-3.8, which correlates with a thickness of 30-200 nanometres.

A person skilled in the art may adjust the thickness of the aluminium layer appropriately, for example, depending on the intended shelf life, the packaged product and the overall thickness of the packaging material. In the multi-layer flexible packaging material in accordance with present invention, the aluminium layer may have a thickness in the range of 20-500 nm, 30-400 nm, or 50-200 nm, for example.

A nanoclay barrier coating layer is known to people skilled in the art. For example. The nanoclay barrier coating layer may be a PVOH-polyacrylic acid-nanoclay barrier coating layer. Examples of such PVOH-polyacrylic acid-nanoclay barriers are commercially available from specialist suppliers. Also, a person skilled in the art will be able to formulate such PVOH-polyacrylic acid-nanoclay barriers. Sustainable barrier Coatings in Paper and Board to 2023, a state of the art report, Smithers information Ltd. 2018, pages 134-142, summarizes the state of the art. Typically such PVOH-polyacrylic acid-nanoclay barriers can be manufactured, e.g., by functionalizing the surface of the nanoclay to allow sufficient repulsive forces to allow for the formation of the tortuous path. The nanoclays may be selected from the group consisting of aluminosilicates, such as montmorillonite (MMT) nanoclays, for example.

For some applications it may be preferred if the nanoclay barrier coating layer has a composition comprising polyurethane. Polyurethane may be used to partially or completely replace the PVOH-polyacrylic matrix. Polyurethane has the advantage of imparting very good chemical resistance, solvent resistance and durability, for example. As such, the nanoclay barrier coating layer composition may comprise between 1-10 weight-% polyurethane, between 2-6 weight-% polyurethane, or between 3-5 weight-% polyurethane, for example.

For some applications it may be preferred, if the nanoclay is dispersed in a polyvinylidene dichloride polymer matrix. In this case intrinsic hydrophobicity and steric hindrance effects in PVDC matrix further improve the WVTR barrier properties of the coating.

The sealing layer applied to the surface of the nanoclay barrier coating layer may be selected from the group consisting of styrene-butadiene, acrylic copolymers, polyvinylidene dichloride, styrene-acrylate, thermoplastic starches, thermoplastic cellulose derivatives and other thermoplastic carbohydrates, thermoplastic proteins, ethyl-vinyl alcohol, vinyl acetate, ethyl-vinyl acetates, polyhydroxyalkanoates. Such sealing layers may be polymer dispersions and/or heat seal coatings, for example heat sealable polymer dispersions. Examples are available, for example, from Michelman. Such sealing layers may impart many properties to the multi-layer flexible packaging material in accordance with the present invention. Typically, they provide a water vapor barrier, for example.

The multi-layer flexible packaging material of the present invention may be a packaging material for a food product. It may be a primary packaging material, a secondary packaging material or a tertiary packaging material, for example. If the multi-layer flexible packaging material is a packaging material fora food product, a primary packaging material for a food product may be a packaging material for a food product that is in direct contact with the actual food product. A secondary packaging material for a food product may be a packaging material for a food product that helps secure one or more food products contained in a primary packaging. Secondary packaging material is typically used when multiple food products are provided to consumers in a single container. A tertiary packaging material for a food product may be a packaging material for a food product that helps secure one or more food products contained in a primary packaging and/or in a primary and secondary packaging during transport.

For some applications of the present invention it may be preferred if the paper layer was non-porous. If the paper layer has a porous surface, an additional surface layer covering the porous paper surface may be added to make it air impermeable. Such an additional surface layer can comprise or consist of starch, pigment-starch or a pigment-latex formulation. The ratio of pore volume to total volume of the paper material is called the porosity of the paper material. For the purpose of the present invention, a paper layer shall be considered as non-porous if a Gurley permeability is less than 20 ml/min (Tappi T547), if it has a porosity of less than 40%, for example, less than 30% or less than 20%. Hence, in one embodiment of the present invention, the paper layer is a non-porous paper layer.

It may also be preferred, if the paper layer had a low surface roughness. The inventors have found that a low surface roughness is beneficial for the purpose of the present invention. For example, the paper layer may have a Bendsten roughness of less than 100 ml/min. The Bendsten roughness can be determined in accordance with ISO 8791-2:2013, herewith incorporated herein by reference.

Barrier properties of packaging materials are well known to the person skilled in the art. If the packaging material is a packaging material for a food product, for example, such good barrier properties are essential for maintaining the safety and quality of packaged foods. Typically, such barrier properties include gas permeability, for example $O_2$, $CO_2$, and $N_2$; vapor permeability, for example water vapor; liquid permeability, for example water or oil; aroma permeability; and light permeability.

The multi-layer flexible packaging material of the present invention may be structured so that the aluminium layer is applied to the outside of the paper layer and the nanoclay barrier coating layer is applied to the inside of the paper layer. If the aluminium layer is applied to the outside of the paper layer this may mean that the aluminium layer would be used as a base for printing inks. If the nanoclay barrier coating layer is applied to the inside of the paper layer than this may mean that the nanoclay barrier coating layer would be a base for a heat sealable layer.

Before the aluminium layer and/or the nanoclay barrier are applied to the paper layer, primers may be used to better connect the coating with the paper layer. Primers typically have a chemical nature that allows that the coating adheres strongly to them, while the primer—in turn—adheres strongly to the paper layer.

Primers for the purpose of the present invention may be selected from the group consisting of acrylic acid copolymers, polyesters, polyhydroxyalkanoates, native and chemically modified starches, xylan and chemically modified xylan, polyvinylidene dichloride, polyvinyl alcohol, ethyl-vinyl alcohol, vinyl acetate, ethyl-vinyl acetates, cellulose nitrate, silanes, polyurethanes, or combinations thereof.

One or more primers used for the purposes of the present invention may comprise nanoclay. Adding nanoclay to at least one primer has the advantage that the barrier properties of the resulting multi-layer flexible packaging material are improved. Hence, in the multi-layer flexible packaging material in accordance with the present invention, for example, the primer applied to the inner surface of the paper layer may comprise nanoclay. This results in enhanced barrier properties.

Appropriate primers are known to the person skilled in the art and can be selected accordingly. The primer to be applied between paper layer and aluminium layer may be polyurethane, for example. Alternatively, a polyurethane tie layer may be used. The primer to be applied between paper layer and nanoclay barrier coating layer may also be polyurethane.

To ensure that the aluminium layer is well protected against abrasion, for example, it may be protected with a protection layer. Appropriate protection layers are well-known to the person skilled in the art and may be selected from the group consisting of acrylic acid copolymers, polyesters, polyhydroxyalkanoates, native and chemically modified starches, xylan and chemically modified xylan, polyvinylidene dichloride, polyvinyl alcohol, ethyl-vinyl alcohol, vinyl acetate, ethyl-vinyl acetates, cellulose nitrate, silanes, polyurethanes, or combinations thereof. Using such protection layers has the advantage that the aluminium layer is stabilized and well protected against unfavourable influences, maintaining its integrity and—hence—its positive influence on the barrier properties of the multi-layer flexible packaging material of the present invention.

The multi-layer flexible packaging material in accordance with the present invention comprises a sealing layer.

Coating paper materials, such as paper packaging materials, with a sealing layer, for example, with polymer dispersions, e.g., to improve the barrier properties of the paper material, is well known in the art. Examples are, for example described in Kimpimäki T., Savolainen A. V. (1997) Barrier dispersion coating of paper and board. In: Brander J., Thorn I. (eds) Surface Application of Paper Chemicals. Springer, Dordrecht. coated, paper materials. As polymers, typically modified ordinary styrene-butadienes, acrylates, methacrylates, vinylene acetates, natural biopolymers or copolymers or combinations of these may be used. One advantage of such dispersion coatings is that they are usually recyclable. For the purpose of the present invention, the dispersion coating may be, for example, one or a plurality of layers comprising acrylic acid copolymers, polyesters, polyhydroxyalkanoates, native and chemically modified starches, xylan and chemically modified xylan, polyvinylidene dichloride, polyvinyl alcohol, ethyl-vinyl alcohol, vinyl acetate, ethyl-vinyl acetates, cellulose nitrate, silanes, polyurethanes, or combinations thereof. In one embodiment of the present invention, the sealing layer may comprise an acrylic acid copolymer. For the purposes of the present invention, the sealing layer may be selected from the group consisting of acrylic acid copolymers, vinyl acetate, ethyl vinyl acetate, modified xylanes, chemically modified starch, or combinations thereof.

Hence, in the multi-layer flexible packaging material in accordance with the present invention:
- a primer may be applied to the outer surface of the paper layer,
- the aluminium layer may be applied to the surface of the primer applied to the outer surface of the paper layer by means of vacuum deposition process, and
- a protection layer may be applied to the surface of the aluminium layer; and
- a primer may be applied to the inner surface of the paper layer,
- the nanoclay barrier coating layer may be applied to the surface of the primer applied to the inner surface of the paper layer, and
- the sealing layer may comprise an acrylic acid copolymer.

For consumer information and design purposes an ink layer may be applied onto the protection layer. Also here it may be preferred, if there is a primer applied between protection layer and ink layer. Appropriate primers are known to the person skilled in the art, and may, for example, be a polyurethane primer.

In order to add a high quality finishing to the outer surface of the multi-layer flexible packaging material in accordance with the present invention an overprint varnish (OPV) may be applied to the surface of the ink layer. OPV are well-known to the person skilled in the art and may be chosen, e.g., according to the intended purpose of the packaging material of the present invention. For example, the OPV may be selected from the group consisting of conventional offset letterpress varnishes, acrylic varnishes, UV varnishes, and gravure varnishes which can be represented by water or solvent-based polymer formulations.

Thus, the multi-layer flexible packaging material of the present invention may further comprise a primer applied to the protection layer, an ink layer applied to the primer on the protection layer, and an overprint varnish layer applied to the ink layer.

An embodiment of the present invention, hence, relates to a multi-layer flexible packaging material comprising:
- a paper layer,
- an aluminium layer,
- an PVOH-polyacrylic acid-nanoclay barrier coating layer, and
- a sealing layer applied to the surface of the PVOH-polyacrylic acid-nanoclay barrier coating layer representing the inner surface of the multi-layer flexible packaging material, wherein
- a primer is applied to the outer surface of the paper layer,
- the aluminium layer is applied to the surface of the primer applied to the outer surface of the paper layer by means of vacuum deposition process,
- a protection layer is applied to the surface of the aluminium layer,
- a primer is applied to the surface of the protection layer,
- an ink layer applied to the surface of the primer on the protection layer, and
- an overprint varnish layer applied to the surface of the ink layer; and
- a primer is applied to the inner surface of the paper layer,
- the PVOH-polyacrylic acid-nanoclay barrier coating layer is applied to the surface of the primer applied to the inner surface of the paper layer, and
- the sealing layer comprises an acrylic acid copolymer.

As discussed above, the inventors were surprised to see that comparable satisfying barrier properties were achieved when aluminium layer and PVOH-polyacrylic acid-nanoclay barrier coating layer were both located on the inner side of the packaging material facing the packaged product. This allows it that only the ink layer, optionally together with primer and/or OVP is on the outer surface of the packaging material. Consequently, aluminium layer and PVOH-polyacrylic acid-nanoclay barrier coating layer are well protected from any external influence, for example, during shipping, handling and consumer contact, so that their integrity is well protected and the barrier properties of the multi-layer flexible packaging material of the present invention are easier to maintain.

Hence in the multi-layer flexible packaging material in accordance with the present invention:
- a primer may be applied to the inner surface of the paper layer,
- the aluminium layer may be applied to the surface of the primer applied to the inner surface of the paper layer by means of vacuum deposition process, and
- a protection layer may be applied to the surface of the aluminium layer,
- a primer may be applied to the surface of protection layer,
- the PVOH-polyacrylic acid-nanoclay barrier coating layer may be applied to the surface of the primer applied to the surface of the protection layer,
- the sealing layer may comprise an acrylic acid copolymer; and
- an ink layer may be applied to the outer surface of the paper layer, and
- an overprint varnish layer may be applied to the ink layer.

An embodiment of the present invention, hence, relates to a multi-layer flexible packaging material comprising:
- a paper layer,
- an aluminium layer,
- a PVOH-polyacrylic acid-nanoclay barrier coating layer, and
- a sealing layer applied to the surface of the PVOH-polyacrylic acid-nanoclay barrier coating layer representing the inner surface of the multi-layer flexible packaging material, wherein
- a primer is applied to the inner surface of the paper layer,
- the aluminium layer is applied to the surface of the primer applied to the inner surface of the paper layer by means of vacuum deposition process, and
- a protection layer is applied to the surface of the aluminium layer,
- a primer is applied to the surface of protection layer,
- the PVOH-polyacrylic acid-nanoclay barrier coating layer is applied to the surface of the primer applied to the surface of the protection layer,
- the sealing layer comprises an acrylic acid copolymer; and
- an ink layer is applied to the outer surface of the paper layer, and
- an overprint varnish layer is applied to the ink layer.

The multi-layer flexible packaging material in accordance with the present invention may have any thickness suitable for packaging materials. A person skilled in the art will be able to determine an appropriate thickness. Typically, however, in particular if the packaging material is intended for use in packaging food products, the packaging material should be as thin as possible, while still ensuring safety and shelf life of the food product. For example, the multi-layer flexible packaging material in accordance with the present invention may have an overall thickness in the range of 30-150 µm, 40-120 µm, or 50-100 µm.

A person skilled in the art may select the grammages or thicknesses of the individual components of the multi-layer flexible packaging material in accordance with the present invention appropriately. For example, the primer preceding the aluminium layer may have a thickness in the range of 1-10 µm, 2-8 µm, or 3-6 µm. The protection layer may have a thickness in the range of 1-10 µm, 2-9 µm, or 3-8 µm. The primer preceding the PVOH-polyacrylic acid-nanoclay barrier coating layer may have a thickness in the range of 0.5-5 µm, 0.8-4 µm, or 1-3 µm. The PVOH-polyacrylic acid-nanoclay barrier coating layer may have a grammage in the range of 0.4-4 g/m2, 0.5-4 g/m2, or 0.6-3 g/m2. The sealing layer may have a grammage in the range of 1.5-10 g/m2, 2-8 g/m2, or 2.5-7 g/m2.

For example, in the multi-layer flexible packaging material in accordance with the present invention:
- the primer preceding the aluminium layer has a thickness in the range of 1-10 µm,
- the aluminium layer has a thickness in the range of 20-500 nm, and
- the protection layer has a thickness in the range of 1-10 µm,
- the primer preceding the PVOH-polyacrylic acid-nanoclay barrier coating layer has a thickness in the range of 1-3 µm,
- the PVOH-polyacrylic acid-nanoclay barrier coating layer has a grammage in the range of 0.4-4 g/m$^2$, and
- the sealing layer has a grammage in the range of 1.5-10 g/m$^2$.

In a preferred embodiment of the present invention, the multi-layer flexible packaging material in accordance with the present invention may be recyclable. For example, it may be recyclable with the paper and carton stream. During recycling, the aluminium layer will be separated from the rest of the packaging. The fact that the subject matter of the present invention achieves it to omit a polyolefin layer, such as a PE or a PP layer, improves the sortability of the packaging material of the present invention during recycling. Typically, aluminium is separated from the rest of the packaging material during recycling in a hydra-pulper. Hence, the multi-layer flexible packaging material in accordance with the present invention may be recyclable as paper and/or carton.

One advantage of the subject matter of the present invention is it that despite omitting a polyolefin layer, such as a PE or a PP layer, excellent barrier properties are achieved. The multi-layer flexible packaging material in accordance with the present invention may have a WVTR barrier in the range of 0.5-15 g/m2d (38° C., 90% RH) and/or a OTR barrier in the range of 0.5-400 cm3/m2 bar (23° C. 50% RH).

These excellent barrier properties allow it that the multi-layer flexible packaging material in accordance with the present invention may be used to package food products. For the purpose of the present invention, the term "food" shall mean in accordance with Codex Alimentarius any substance, whether processed, semi-processed or raw, which is intended for human consumption, and includes drink, chewing gum and any substance which has been used in the manufacture, preparation or treatment of "food" but does not include cosmetics or tobacco or substances used only as drugs.

Remarkably, the excellent barrier properties allow it that the multi-layer flexible packaging material in accordance with the present invention may be used to package dry food products. Dry food products include powders and granulates, for example powders and granulates to be reconstituted in milk or in water. Dry food products may have a water content of 5% or less, for example.

Hence, the multi-layer flexible packaging material in accordance with the present invention may be to be used to package dry food. The subject matter of the present invention also extends to the use of a multi-layer flexible packaging material in accordance with the present invention to package dry food.

Those skilled in the art will understand that they can freely combine all features of the present invention disclosed herein. In particular, features described for the product of the present invention may be combined with features described for the process of the present invention and vice versa. Further, features described for different embodiments of the present invention may be combined.

Although the invention has been described by way of example, it should be appreciated that variations and modifications may be made without departing from the scope of the invention as defined in the claims.

Furthermore, where known equivalents exist to specific features, such equivalents are incorporated as if specifically referred in this specification. Further advantages and features of the present invention are apparent from the figures and non-limiting examples.

EXAMPLES

Figure 2:
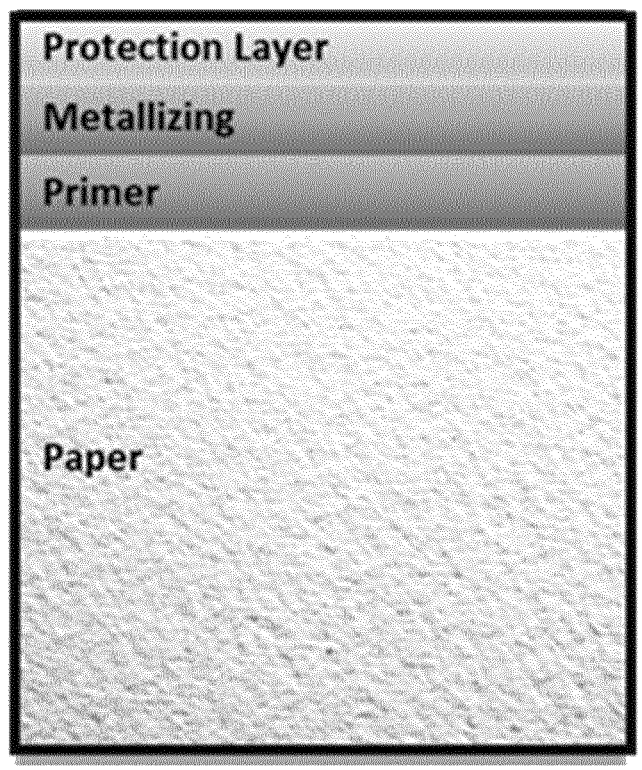
FIG. 2 shows schematically an unprocessed metallized paper.

Unprocessed metallized paper as schematically shown in FIG. 2 with a water vapor transmission rate (WVTR) of 2.473 g/m2/day (measurement conditions of 38° C., 90% RH) was selected to apply various coatings to the paper side (structure 1) or the metallized side to produce the structures schematically shown in FIG. 1 (structure 2). Both, structure 2 and structure 3 were coated with primer, water vapor barrier coating & heat seal coatings.

The structures were subjected to a WVTR measurement showing an improvement of the water vapor barrier with both proposed structure designs. The results are shown in the table below:

WVTR Result

| No of test | Unprocessed metallized paper | Structure 1 | Structure 2 |
| --- | --- | --- | --- |
| 1 | 2.473 | 1.018 | 0.479 |
| 2 | NA | 1.289 | 1.067 |

In a separate trial, another metallized paper with very high oxygen transmission rate (OTR) of 692.2 cc/m2/day (measurement conditions of 23° C., 50% RH) was selected to apply various coatings at both paper side (structure 1) and metallized side (structure 2). Both structure 1 and structure 2 were coated with primer, oxygen barrier coating & heat seal coating.

The OTR measurement in the following once again showed an improvement of oxygen barrier with both proposed structure design. The results are shown in the table below:

OTR Result

| No of test | Unprocessed metallized paper | Structure #2 | Structure #3 |
|---|---|---|---|
| 1 | 930.02 | 29.43 | 45.82 |
| 2 | 460.81 | 7.76 | 14.20 |
| 3 | 685.81 | 10.66 | 79.83 |
| Average: | 692.213 | 15.950 | 46.617 |

The invention claimed is:

1. A multi-layer flexible packaging material comprising the following layers from an outer surface to an inner surface:
   an aluminium layer having a thickness in the range of 20-500 nm,
   a paper layer having a grammage of 40 to 120 g/m2,
   a nanoclay barrier coating layer having a grammage in the range of 0.4-4 g/m2,
   a sealing layer applied to a surface of the nanoclay barrier coating layer representing the inner surface of the multi-layer flexible packaging material, wherein the sealing layer is selected from the group consisting of acrylic acid copolymers, vinyl acetate, ethyl vinyl acetate, modified xylanes, chemically modified starch, and combinations thereof,
   and the multi-layer flexible packaging material being deprived of a polyolefin layer.

2. The multi-layer flexible packaging material in accordance with claim 1, wherein:
   a primer is applied to an outer surface of the paper layer;
   the aluminium layer is applied to a surface of the primer applied to the outer surface of the paper layer by means of vacuum deposition process;
   a protection layer is applied to a surface of the aluminium layer;
   a primer is applied to a inner surface of the paper layer;
   the nanoclay barrier coating layer is applied to the surface of the primer applied to the inner surface of the paper layer; and
   the sealing layer comprises an acrylic acid copolymer.

3. The multi-layer flexible packaging material in accordance with claim 2, further comprising:
   a primer applied to the protection layer,
   an ink layer applied to the primer on the protection layer, and
   an overprint varnish layer applied to the ink layer.

4. The multi-layer flexible packaging material in accordance with claim 1, wherein
   a primer is applied to the inner surface of the paper layer,
   the aluminium layer is applied to the surface of the primer applied to the inner surface of the paper layer by means of vacuum deposition process,
   a protection layer is applied to the surface of the aluminium layer,
   a primer is applied to the surface of protection layer,
   the nanoclay barrier coating layer is applied to the surface of the primer applied to the surface of the protection layer,
   the sealing layer comprises an acrylic acid copolymer,
   an ink layer is applied to the outer surface of the paper layer, and
   an overprint varnish layer is applied to the ink layer.

5. The multi-layer flexible packaging material in accordance with claim 1, wherein the nanoclay barrier coating layer is a PVOH-polyacrylic acid-nanoclay barrier coating layer.

6. The multi-layer flexible packaging material in accordance with claim 1, wherein the sealing layer is selected from the group consisting of polymer dispersions and/or heat sealable polymer dispersions.

7. The multi-layer flexible packaging material in accordance with claim 1, wherein the protection layer is selected from the group consisting of acrylic acid copolymers, polyesters, polyhydroxyalkanoates, native and chemically modified starches, xylan and chemically modified xylan, polyvinylidene dichloride, polyvinyl alcohol, ethyl-vinyl alcohol, vinyl acetate, ethyl-vinyl acetates, cellulose nitrate, silanes, polyurethanes, and combinations thereof.

8. The multi-layer flexible packaging material in accordance with claim 1, wherein the primer is selected from the group consisting of acrylic acid copolymers, polyesters, polyhydroxyalkanoates, native and chemically modified starches, xylan and chemically modified xylan, polyvinylidene dichloride, polyvinyl alcohol, ethyl-vinyl alcohol, vinyl acetate, ethyl-vinyl acetates, cellulose nitrate, silanes, polyurethanes, and combinations thereof.

9. The multi-layer flexible packaging material in accordance with claim 1, wherein the packaging material has an overall thickness in the range of 30-150 μm.

10. The multi-layer flexible packaging material in accordance with claim 1, wherein
    the primer preceding the aluminium layer has a thickness in the range of 1-10 μm,
    the aluminium layer has a thickness in the range of 20-500 nm,
    the protection layer has a thickness in the range of 1-10 μm,
    the primer preceding the nanoclay barrier coating layer has a thickness in the range of 1-3 μm,
    the nanoclay barrier coating layer has a grammage in the range of 0.4-4 g/m2, and
    the sealing layer has a grammage in the range of 1.5-10 g/m2.

11. The multi-layer flexible packaging material in accordance with claim 1, wherein the multi-layer flexible packaging material is recyclable as paper and/or carton.

12. The multi-layer flexible packaging material in accordance with claim 1, wherein the multi-layer flexible packaging material has a WVTR barrier in the range of 0.5-15 g/m2d (38° C., 90% RH) and/or a OTR barrier in the range of 0.5-400 cm3/m2d bar (23° C. 50% RH).

* * * * *